No. 834,684. PATENTED OCT. 30, 1906.
C. C. SIBLEY & G. A. LUTZ.
CONNECTOR FOR CONDUITS FOR ELECTRIC WIRES.
APPLICATION FILED JULY 18, 1904.
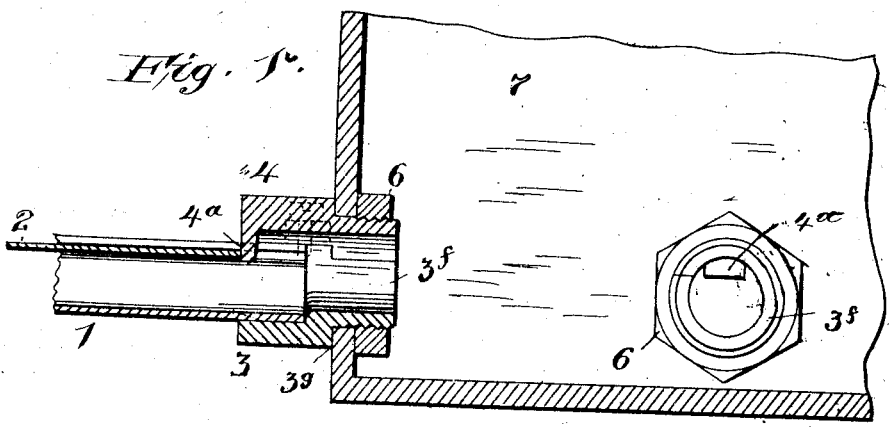
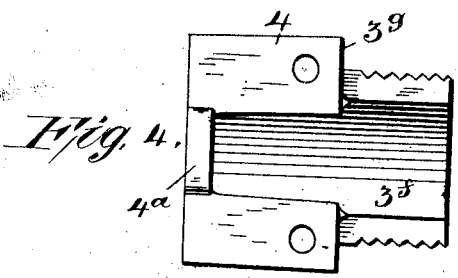
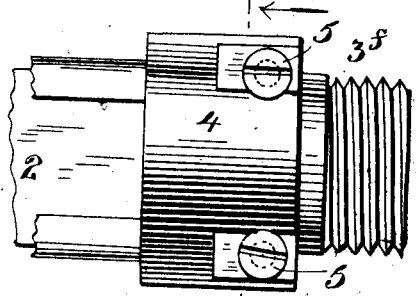
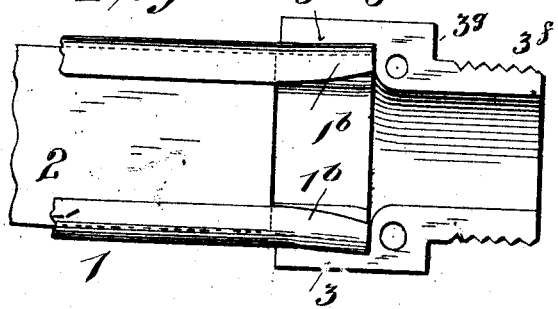
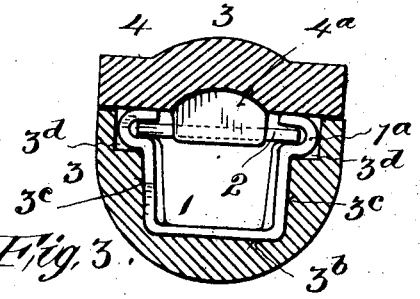
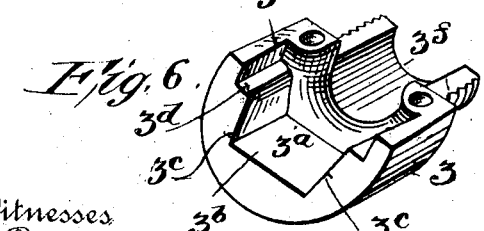
Witnesses
C. W. Benjamin
M. Hollingshead
Inventors
C. C. Sibley & Geo. A. Lutz
By their Attorney
T. F. Browne

UNITED STATES PATENT OFFICE.

CLARENCE C. SIBLEY, OF PERTH AMBOY, NEW JERSEY, AND GEORGE A. LUTZ, OF NEW YORK, N. Y.

CONNECTOR FOR CONDUITS FOR ELECTRIC WIRES.

No. 834,684.  Specification of Letters Patent.  Patented Oct. 30, 1906.

Application filed July 18, 1904. Serial No. 217,062.

*To all whom it may concern:*

Be it known that we, CLARENCE C. SIBLEY, a resident of Perth Amboy, Middlesex county, New Jersey, and GEORGE A. LUTZ, a resident of New York city, borough of Brooklyn, New York, citizens of the United States, have invented certain new and useful Improvements in Connectors for Conduits for Electric Wires, of which the following is a specification.

This invention relates to improved means for connecting conduits, made in two or more parts, with outlet or junction boxes or the like, or with conduits of tubular form; and the invention comprises the novel details of improvement that will be more fully hereinafter set forth and then pointed out in the claims.

Reference is to be had to the accompanying drawings, forming part hereof, wherein—

Figure 1 is a central section showing a conduit of angular form provided with a removable cover connected with an outlet or junction box by means of our improvements. Fig. 2 is an enlarged detail plan view of the connector. Fig. 3 is a cross-section thereof on the line 3 3 in Fig. 2 looking in the direction of the arrows. Fig. 4 is a plan view of the inside of the removable cap. Fig. 5 is a plan view of the connector attached to a conduit, the cap being removed. Fig. 6 is a perspective view of the connector, the cap being removed; and Fig. 7 is a detail perspective view of the end of a conduit.

Similar numerals of reference indicate corresponding parts in the several views.

In the drawings we have shown our improved connector as applied to a conduit 1 of the class made substantially in angular or channel form provided with a bottom and side walls that have opposed grooves $1^a$, that receive a removable cover 2, which may slide in such grooves.

Our connector is made in two main members 3 4, detachably connected together, as by screws 5. The member 3 at one end is provided with a socket portion $3^a$, having a bottom $3^b$ and side walls $3^c$, that correspond in outline to the contour of the conduit 1, and also has offset recesses $3^d$, that receive the webs of the conduit having the opposed groove $1^a$, whereby the end of the conduit may fit snugly within such socket portion of the connector member 3.

To prevent the connector from pulling off the end of the conduit, the side walls of the recesses $3^d$ are tapered or converge outwardly and the side webs of the conduit that fit within such recesses are bent outwardly at $1^b$, so that the flaring webs will bear against the taper walls $3^e$, as shown in Fig. 5. The cover member 4 of the connector fits over the flared ends $1^b$ of the conduit, and the screws 5 keep the connector members clamped upon the ends of the conduit. The cover member 4 has a lug or projection $4^a$, that projects into the conduit in line with the cover 2 to limit the inward movement of said cover into the connector, whereby the cover may be brought up snug against the connector. (See Figs. 1 and 3.) The opposite ends $3^f$ of the members of the connector are tubular and are shown provided with screw-threads to receive the nut 6, each member 3 4 carrying a portion of such tubular extension.

In Fig. 1 the tubular extension $3^f$ is shown passing through an aperture in an outlet or junction box 7, the nut 6 clamping the shoulder portion $3^g$ of the connector firmly against the box. This tubular extension $3^f$ of the connector also permits the latter to be attached to other terminal devices or to tubular conduits or pipes by means of threaded sleeves or other connections.

By means of our improvements we are enabled to connect conduits made in angular form and also those made of two or more parts with circular holes in boxes or other terminals or with tubular extensions therefrom or with tubular conduits or pipes, with the assurance of a rigid connection between such conduits and other parts. The connector also permits of the ready detachment of the conduit when required and also of proper adjustment of the wires within the conduit and the proper placing of the cover upon the same.

The particular details of construction shown and described and the particular form of conduit illustrated for use in connection with our connector may be varied without departing from the spirit of our invention.

Having now described our invention, what we claim is—

1. The combination of a conduit made in angular form, with a connector having a socket to receive the end of the conduit and corresponding in shape to the contour of the conduit, a removable member over the socket, and a tubular extension on said connector, said extension having external threads, a box having a hole through which said threaded extension passes, and a nut on said threaded extension within the box holding the connector thereto, substantially as described.

2. The combination of a conduit provided with a removable sliding cover, with a connector having a socket receiving said conduit and provided with a tubular extension, said connector having a lug lying in the path of the cover of the conduit, substantially as described.

3. The combination of a conduit having a bottom, and side walls provided with opposed grooves, and a removable cover located in said grooves, with a connector having a socket corresponding in shape to the conduit and provided with inwardly-tapering or converging walls receiving the grooves on the conduit, said connector being provided with a tubular extension on the side opposite the socket, the grooves at the end of the conduit being flared to coöperate with the corresponding walls of the socket, substantially as described.

4. The combination of a conduit having a bottom, and side walls provided with opposed grooves, the end portion of the webs forming such grooves being bent outwardly, and a cover removably carried in said grooves, with a connector comprising a pair of members, one of which has a socket corresponding to the conduit and recesses having tapering or converging side walls to receive the flared ends of said webs, and means for clamping said members together, substantially as described.

5. The combination of a conduit having a bottom and side walls provided with opposed grooves, the end portion of the webs forming such grooves being bent outwardly, and a cover removably carried in said grooves, with a connector comprising a pair of members, one of which has a socket corresponding to the conduit and recesses having tapering or converging side walls to receive the flared ends of said webs, and means for clamping said members together, one of said members having a lug projecting in the path of the cover, substantially as described.

6. The combination of a conduit having a bottom and side walls provided with opposed grooves, the end portions of the webs forming such grooves being bent outwardly, and a cover removably carried in said grooves, with a connector comprising a pair of members, one of which has a socket corresponding to the conduit and recesses having tapering or converging side walls to receive the flared ends of said webs, means for clamping said members together, one of said members having a lug projecting in the path of the cover, said connector having a tubular extension on the side opposite said socket, substantially as described.

7. A connector for conduits comprising a pair of members, one of which is provided with a socket at one end having a bottom, and sides extending at an angle to the bottom, and said members having a tubular extension at the opposite end, a portion of which extension is formed on each member, threads on said extended portions, and a nut on said extended portions holding them together, one of said members having a lug extending into the socket, substantially as described.

8. A connector comprising a pair of members, one of which has a socket having a bottom and side walls extending at an angle to the bottom, and recesses at the ends of said walls, the distance between the side walls of the recesses being greater than the distance between the first-mentioned walls, said members having a tubular extension at the end opposite the socket provided with external threads, substantially as described.

9. A connector comprising a pair of members, one of which has a socket in angular form and recesses at the open side of the socket, the distance between the side walls of the recesses being greater than the width of the socket, the side walls of said recesses tapering or converging, said members having a tubular extension at the opposite end, one of said members having a lug projecting toward said socket, substantially as described.

10. A connector for conduits comprising a pair of members, one of which is provided with a socket opening through one end having a bottom, and sides extending at an angle to the bottom, the other member having a lug projecting toward the socket in line therewith, and means to hold said members firmly united, substantially as described.

CLARENCE C. SIBLEY
GEORGE A. LUTZ.

Witnesses:
CHARLES E. LOCKWOOD,
T. F. BOURNE.